United States Patent [19]

Bothwell

[11] 4,010,812

[45] Mar. 8, 1977

[54] MOTORCYCLE FRAME

[76] Inventor: Peter William Bothwell, 114 Shipston Road, Stratford-upon-Avon, Warwickshire, England

[22] Filed: May 21, 1975

[21] Appl. No.: 579,669

Related U.S. Application Data

[63] Continuation-in-part of Ser. No. 406,914, Oct. 16, 1973, abandoned.

[30] Foreign Application Priority Data

May 22, 1974 United Kingdom ............ 22857/74

[52] U.S. Cl. .............................. 180/33 A; 180/32; 280/281 R; 280/281 B
[51] Int. Cl.² ......................................... B62K 11/04
[58] Field of Search ................ 180/33 R, 33 A, 34, 180/35, 30, 32; 280/281 R, 281 B, 289

[56] References Cited

UNITED STATES PATENTS

| 2,773,695 | 12/1956 | Holloway .................. 280/281 R X |
| 3,521,904 | 7/1970 | Sheffer ........................ 180/32 X |

FOREIGN PATENTS OR APPLICATIONS

| 182,973 | 1/1955 | Austria ........................... 180/33 R |
| 1,011,144 | 6/1952 | France ............................ 180/33 R |
| 412,839 | 2/1946 | Italy ................................... 180/30 |
| 616,521 | 2/1961 | Italy ............................. 280/281 R |
| 1,247,180 | 9/1971 | United Kingdom .......... 280/281 R |
| 556,398 | 10/1943 | United Kingdom ............. 180/33 R |
| 167,411 | 8/1921 | United Kingdom ........... 280/281 R |

Primary Examiner—Joseph F. Peters
Assistant Examiner—John P. Silverstrim
Attorney, Agent, or Firm—Kurt Kelman

[57] ABSTRACT

A motor cycle frame comprising a rigid transverse bulkhead disposed between and interconnecting a front cantilever structure and a rear cantilever structure, the bulkhead constituting a mounting for an engine and a gearbox. The bulkhead comprises an annular or inverted U-shape plate or a rigid box-form structure and the front and rear structures each comprises a rigid housing or a rigid structure of interconnected tubular members and enclosed within a faired housing. The front structure has mounting means for a front wheel, the bulkhead has mounting means for a rear wheel and the rear structure has mounting means for a suspension for the rear wheel and mounting means for a seat.

14 Claims, 10 Drawing Figures

MOTORCYCLE FRAME

REFERENCE TO RELATED APPLICATIONS

This is a continuation in part of my patent application Ser. No. 406,914 filed Oct. 16, 1973, and now abandoned.

BACKGROUND OF THE INVENTION

This invention relates to motor cycles and has for its object to provide an improved motor cycle frame.

SUMMARY OF THE INVENTION

According to the present invention I provide a motor cycle frame comprising a rigid transverse bulkhead, a rigid front cantilever structure which is supported by and projects forwardly from the bulkhead, and a rigid rear cantilever structure which is supported by and projects rearwardly from the bulkhead, the bulkhead constituting mounting means for an engine and a gearbox.

Preferably, the bulkhead has portions which are arranged to extend above and on each side of an engine and a gearbox mounted thereon.

Preferably, the bulkhead further comprises mounting means for a rear wheel, the front structure further comprises mounting means for a front wheel, and the rear structure further comprises mounting means for a suspension for the rear wheel and mounting means for a seat.

The main structural part of the frame is the transverse bulkhead which can be formed as a torsionally rigid unit, and the front and rear structures are supported from it in cantilever fashion. The bulkhead provides a rigid and strong mounting for the engine and the gearbox of the motor cycle, and the engine and the gearbox can form a structurally integral unit with the bulkhead so that they reinforce the bulkhead. By providing a rigid transverse bulkhead the frame is made capable of withstanding side impacts without deformation of the bulkhead.

An advantage of the present invention is that the frame is suitable for sub-assembly production methods, i.e. the bulkhead and the engine on the one hand and the front and rear structures on the other hand can be assembled separately. It also has advantages in the repair of accident damage in that only that part of the frame which has been damaged, need be replaced. The frame can be made lighter in weight than conventional frames whilst having improved strength and rigidity.

A further advantage of the invention is that a substantially vertical or slightly inclined engine can be used, this being facilitated by the bulkhead which provides a very convenient mounting for the engine.

The bulkhead may comprise a plate of inverted U-shape which has the front and rear structures secured thereto and constitutes the mounting means for both an engine and a gearbox, or the bulkhead may comprise an annular plate which is elongated in the vertical direction and has the front and rear structures secured thereto, and a rearwardly projecting support member which is secured to the annular plate, the annular plate comprising the mounting means for an engine and the support member comprising the mounting means for a gearbox.

In a preferred embodiment the bulkhead comprises a rigid box-frame structure comprising two spaced plates interconnected by webs extending between them.

In one form of the invention the front structure comprises a rigid hollow housing secured at the rear end thereof to the front of the bulkhead and the rear structure comprises a rigid hollow housing secured at the front end thereof to the rear of the bulkhead.

In another form of the invention the front structure is constituted by a rigid structure of tubular members secured to the front of the bulkhead and the rear structure is constituted by a rigid structure of tubular members secured to the rear of the bulkhead.

In the first form the front and rear housings may be faired to provide the frame with a smooth streamlined and attractive appearance. In the second form, the front tubular structure is preferably enclosed within a hollow faired housing secured to the frame. The rear tubular structure may also be at least partially enclosed within a hollow faired housing secured to the frame. The or each housing may be made of a lightweight material, for example a relatively thin plastics material, since it is not a load-bearing part of the frame.

In a modification of the spaced form the front structure enclosed within the faired housing may be a rigid box-form structure secured to or formed integrally with the bulkhead.

BRIEF DESCRIPTION OF THE DRAWINGS.

Various embodiments of the invention will now be described by way of example with reference to the accompanying drawings, in which.

DESCRIPTION OF THE PREFERRED EMBODIMENTS.

Figure 1:
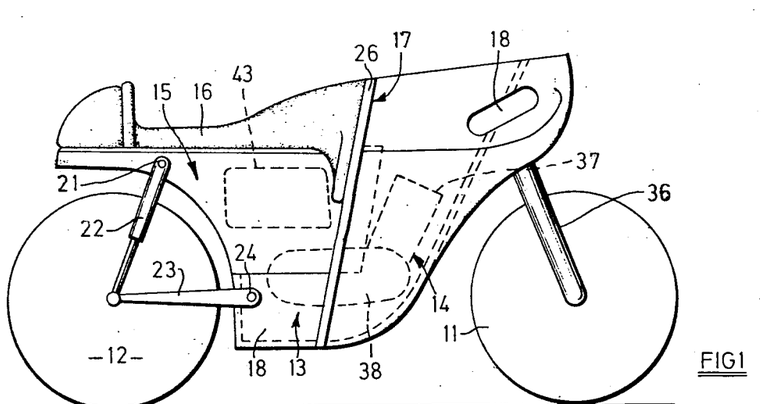
FIG. 1 is a side view of a motor cycle having a frame according to a first embodiment of the invention.

The motor cycle illustrated in FIG. 1 of the drawings comprises a frame mounted on a front wheel 11 and a rear wheel 12. The frame comprises a rigid transverse bulkhead 13 interconnecting a rigid front cantilever structure 14 and a rigid rear cantilever structure 15 which has mounted on it a removable padded saddle-type seat 16.

Figure 2:
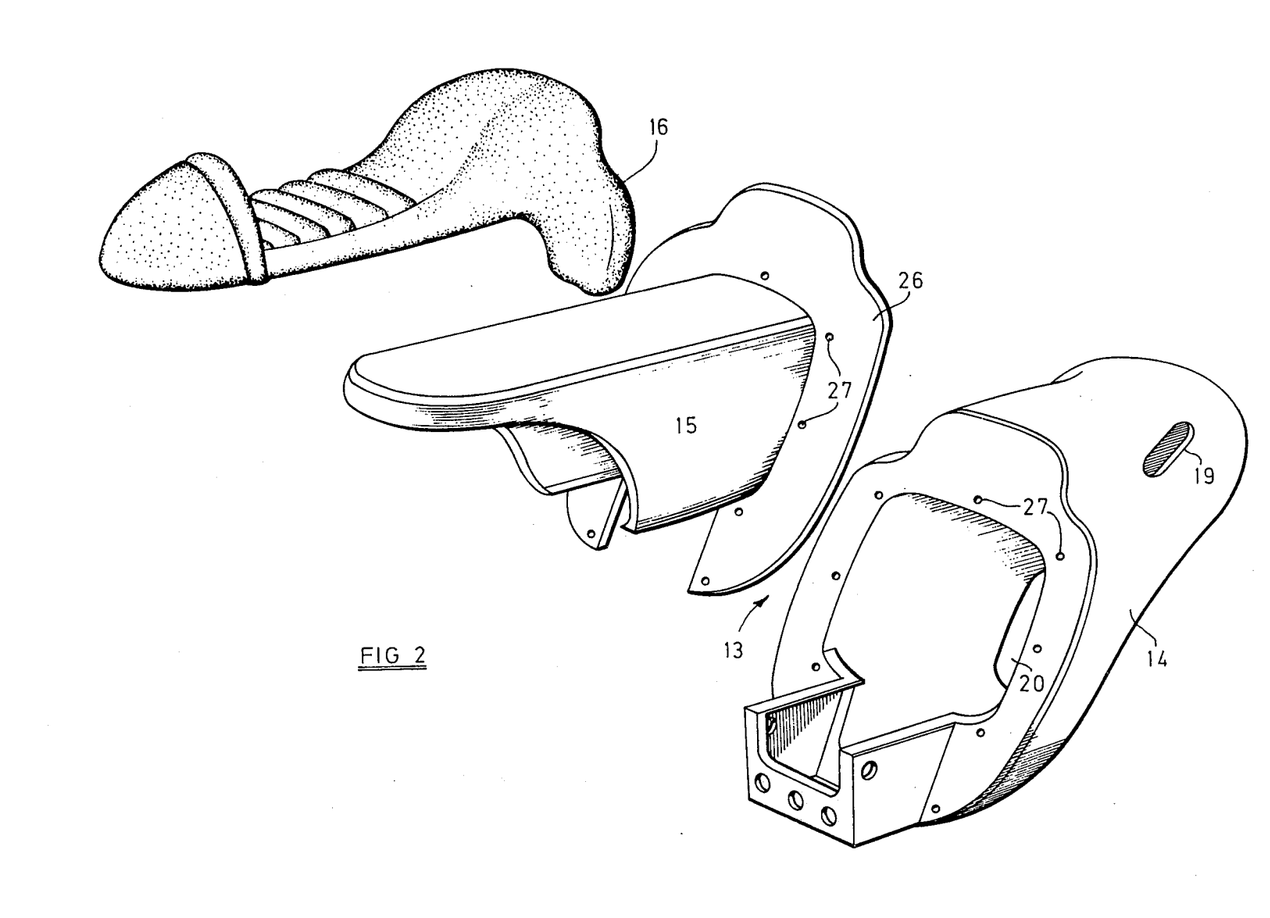
FIG. 2 is an exploded perspective view of the motor cycle frame shown in FIG. 1.
Figure 3:
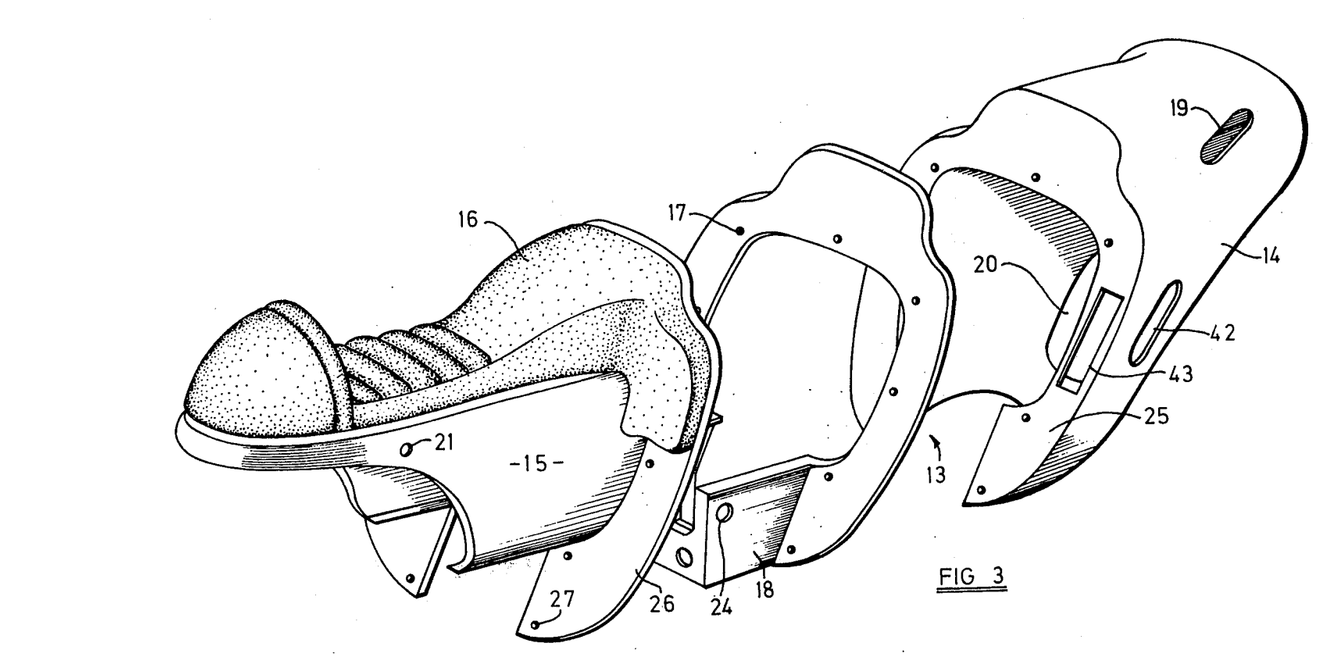
FIG. 3 is a further exploded perspective view of the motor cycle frame shown in FIG. 1.

The bulkhead 13, in the embodiment of FIGS. 1, 2 and 3 comprises an annular plate 17 which is elongated in the vertical direction, and a rearwardly-projecting support member 18 which is secured to the annular plate 17. The engine 37 and the gearbox 38 of the motor cycle are mounted on the bulkhead 13 with the gearbox supported by and bolted to the rearwardly projecting support member 18 and the engine bolted to the annular plate 17.

The front structure 14 comprises a hollow metal housing of generally tubular form and of reducing cross-section in the forward direction, away from the bulkhead 13. A pair of elongate slots 18 are formed one in each side of the front housing 14, and the handlebars of the motor cycle, which extend laterally from a steering head mounted on the front housing and disposed within the latter, pass through the slots 18. The steering head includes a shaft which is mounted for turning in a bearing sleeve rigidly fixed to the front housing, and the shaft has connected to it the legs 36 of a fork which incorporate shock absorber and spring units and carry the front wheel 11. For clarity the handlebars and the steering head are not shown in FIG. 1. A large aperture 20 (FIGS. 2 and 3) is formed in the front housing 14 through which the engine 37 and the gearbox 38 can be inserted for mounting on the bulkhead 13.

The rear structure 15 comprises a hollow metal housing of generally inverted U-shape formed so as to overlie the rear wheel 12. Two pivots 21 are secured to the respective sides of the rear housing 15 and a shock absorber and spring unit 22 is pivotally connected to each pivot 21. The units 22, together with a pair of interconnected swinging arms 23 which are respectively pivotally connected to a pair of pivots 24 secured one on each side of the rearwardly projecting support member 18 of the bulkhead 13, afford a mounting for the rear wheel 12.

As shown in FIGS. 2 and 3, the front housing 14 and the rear housing 15 are formed respectively with an inwardly-directed flange 25 and an outwardly-directed flange 26, which flanges 25, 26 conform to the shape of the annular plate 17 of the bulkhead 13. The flanges 25, 26 and the annular plate 17 are formed with correspondingly spaced and positioned apertures 27 whereby the front and rear housings can be bolted to the front and rear faces of the annular plate 17 of the bulkhead 13. The flange 26 of the rear housing 15 is cut away at the lowermost part thereof so that the rearwardly-projecting support member 18 of the bulkhead can project through and rearwardly of the flange 26.

Figure 4:
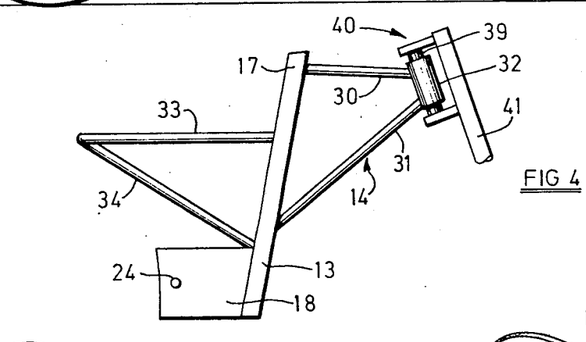
FIG. 4 is a side view of a motor cycle frame according to a second embodiment of the invention.

In the embodiment of FIG. 4, the bulkhead 13 is of the same construction as that shown in the embodiment of FIGS. 1, 2 and 3. In this embodiment, however, the front and rear structures each comprises a structure of interconnected metal tubular members. The front structure 14 comprises a pair of horizontal and forwardly-extending tubular members 30 and a pair of inclined and forwardly-extending tubular members 31. The rearward ends of each pair of tubular members 30, 31 are secured one to each side of the front face of the annular plate 17 of the bulkhead 13 and the tubular members 30, 31 converge and support at the front ends thereof a bearing sleeve 32. Mounted for turning in this sleeve 32 is a shaft 39 of a steering head 40 which has connected to it the legs 41 of a fork carrying the front wheel 11. The rear structure comprises a pair of horizontal and rearwardly-extending tubular members 33 and a pair of inclined and rearwardly-extending tubular members 34, the rearward ends of the tubular members 33, 34 being connected together. The forward ends of each pair of tubular members 33, 34 are secured one to each side of the rear face of the annular plate 17 of the bulkhead 13. As in the embodiment of FIGS. 1, 2 and 3, pivots (not shown) corresponding to the pivots 21 in FIG. 1, are provided for connection to the rear structure of shock absorber and spring units for the rear wheel 12. Pivots 24 are also provided for connection to the rear structure of swinging arms carrying the rear wheel.

The front and rear tubular structures are enclosed within faired housings (not shown).

Figure 5:
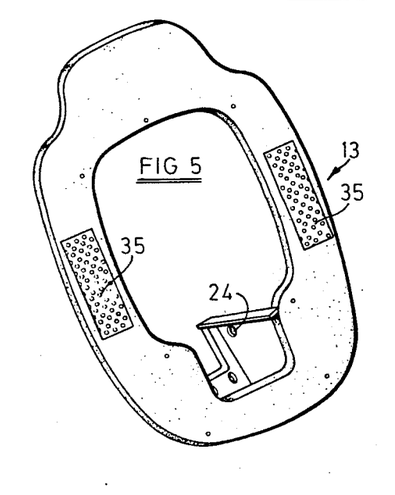
FIG. 5 is a perspective view of the bulkhead of a motor cycle frame according to a third embodiment of the invention.

The bulkhead 13 of the two embodiments of the invention so far described can carry a pair of radiators which form part of the cooling system of the engine. FIG. 5 shows a bulkhead 13 having two radiators 35 mounted in apertures formed in the respective sides thereof. In this event the front housing 14 of the embodiment of FIGS. 1, 2 and 3 is provided with a pair of air ducts as shown at 42 in FIG. 3, one for each radiator 35, for directing air towards the radiators, and the flange 25 of the front section is cut away as shown at 43 at positions corresponding to the positions of the radiators 35 so as to expose the radiators to the flow of cooling air through the ducts.

In a further embodiment of the invention (not shown in the drawings), the front housing 14 can be of generally inverted U-cross section and of reducing cross-section in the forward direction away from the bulkhead 13.

Figure 6:
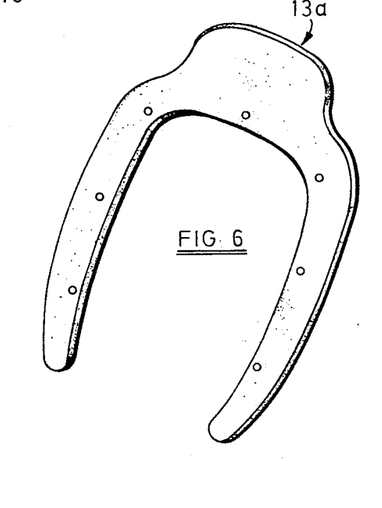
FIG. 6 is a perspective view of the bulkhead of a motor cycle frame according to a fourth embodiment of the invention.

In yet a further embodiment of the invention, the bulkhead can be in the form of an inverted U-shaped plate 13a, as shown in FIG. 6, on which both the engine and the gearbox are mounted. This configuration of bulkhead 13a which defines a wider opening than the bulkheads of the embodiments shown in FIGS. 1 to 5, is particularly appropriate where the transverse dimensions of the engine and gearbox are large.

In all of the embodiments described above, the bulkhead 13 is so shaped and positioned as to provide on each side of the motor cycle frame a leg shield for the rider.

In each embodiment the construction of the front section is such that access can be gained to the bulkhead 13 from the front thereof.

The front structure 14 and/or the rear structure 15 of each embodiment can be used to carry bags or other containers for fuel or coolant for the engine. For example, a fuel container 43 can be located within the rear housing 15 of the embodiment of FIGS. 1, 2 and 3 immediately adjacent the bulkhead 17 and immediately below the padded seat 16.

The motor cycle illustrated in FIGS. 7 to 10 comprises a frame mounted on a front wheel diagrammatically shown at 50 and a rear wheel diagrammatically shown at 51. The frame comprises a rigid transverse bulkhead 52, a rigid front cantilever structure 53 and a rigid rear cantilever structure 54, the structures 53 being supported by the bulkhead and extending respectively forwardly and rearwardly thereof.

Figure 10:
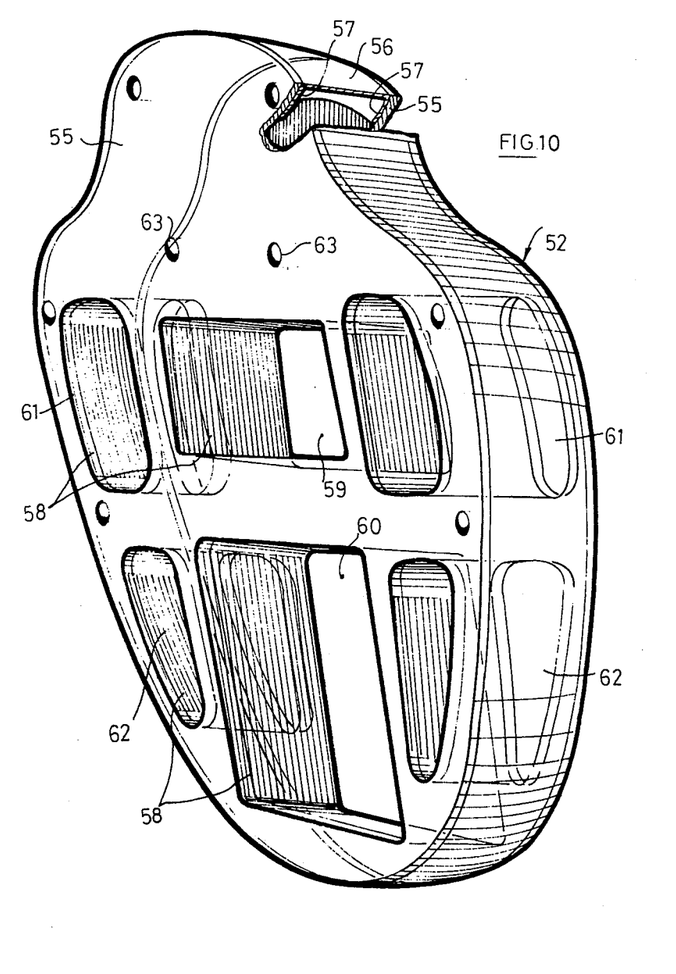
FIG. 10 is a perspective view of the bulkhead of the frame shown in FIG. 7.

Referring particularly to FIG. 10, the bulkhead 52 comprises two spaced metal plates 55 which are generally oval in shape with their narrow ends directed downwardly and are connected together to form a rigid box-form structure by a number of metal webs. These webs include a strip 56 of channel shape in cross-section which extends around the peripheries of the plates 55 and has its side limbs 57 rivetted or otherwise secured to the inner faces of the plates; the strip may be in a number of sections arranged end-to-end. The webs also include a number of plates or tubes 58 welded between the plates 55 to form two central apertures 59 and 60 one above the other, a pair of side apertures 61 and a further pair of side apertures 62 below the apertures 61, all of which apertures extend right through the bulkhead. The plates 55 are formed with holes 63 to facilitate attachment of the front and rear structures to the bulkhead.

The bulkhead has a rearwardly-projecting support 64. comprising two spaced plates bolted to the rear face of the bulkhead at opposite sides of the lower central opening 60 therein, and two forwardly projecting brackets 65 which are bolted to the front face of the bulkhead at opposite sides of the opening 60.

The bulkhead 52 supports a combined engine and gearbox unit shown diagrammatically at 66. The engine is disposed substantially horizonally or at a slight inclination to the horizontal and is bolted to and disposed between the brackets 65. The gearbox extends rearwardly from the engine through the lower central aperture 60 in the bulkhead and is bolted to and disposed between the plates of the support 64. The air intakes for the carburettor of the engines are shown at 67 and are disposed substantially vertically or at a small angle to the vertical. The exhaust pipes of the engine are shown at 68 and extend from the engine rearwardly through the lower portions of the lower pair of side apertures 62 in the bulkhead.

Figure 7:
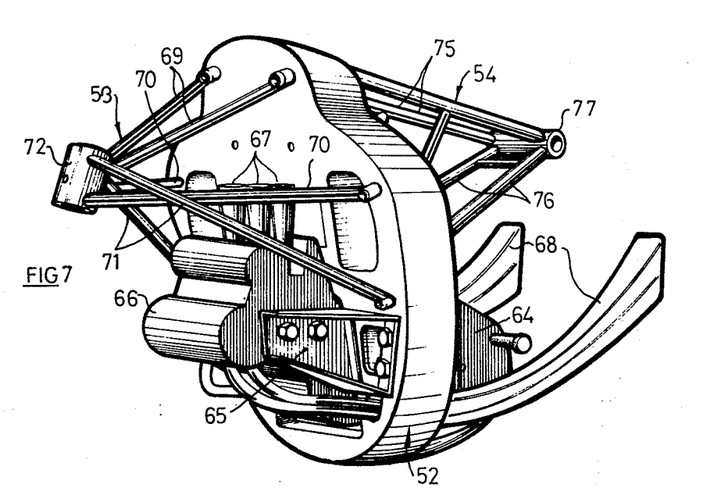
FIG. 7 is a perspective view of a motor cycle frame according to a fifth embodiment of the invention.

The front and rear structures 53 and 54 of the frame each comprises a structure of tubular members secured to the front and rear faces of the bulkhead respectively.

The front structure has two downwardly inclined members 69, two horizontal members 70 and two upwardly inclined members 71. These members are all secured at their rear ends to the bulkhead and they converge towards their front ends which carry a bearing sleeve 72 for a steering head similar to that shown in FIG. 4. The handlebars and the forks of the steering head are shown at 73 and 74 respectively.

The rear section 54 has two downwardly inclined members 75 and two upwardly inclined members 76. These members are secured at their front ends to the bulkhead and converge towards their rear ends which carry a bearing sleeve 77 to which are pivotally connected two suspension units 78 for the rear wheel.

The rear wheel is carried by two swinging arms 79 which are pivotally connected at 80 to the plates of the support 64 and extend rearwardly on opposite sides of the wheel. The plates of the support 64 also carry foot rests 81 for the rider.

It will be observed that the bulkhead extends for the full height of the frame and the front and rear tubular structures are generally of triangular form in two planes perpendicular to one another, i.e. in plan view and in side view. Triangulation of the structures makes them strong and rigid but they are nevertheless capable of collapsing when subjected to an impact, in such a way that they absorb energy of the impact. The bulkhead disposed in front of the rider does not deform on an impact.

Figure 8:
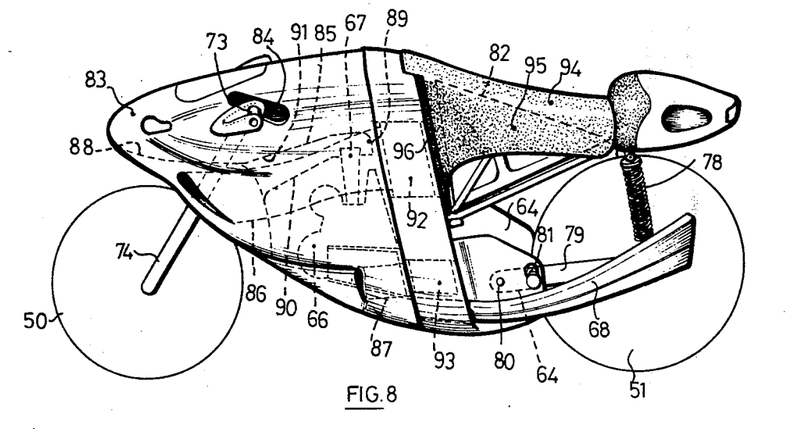
FIG. 8 is a side view of a motor cycle incorporating the frame shown in FIG. 7.

The rear structure 54 carries a fuel tank 82 which is of downwardly tapering form as viewed in side elevation. In this embodiment the tank is of triangular form in side elevation with one of its apexes directed downwardly and comprises two flat triangular side walls which are connected together by a flat top wall and two flat downwardly converging walls. This form and arrangement of the fuel tank presents the advantage that the centre of gravity of the fuel tank with fuel therein is not displaced sideways or to a substantial extent forwardly or rearwardly as the fuel level changes, which would affect the handling of the motor cycle. In a modification of this arrangement the converging walls of the tank are arranged symmetrically about a vertical axis so that the centre of gravity is always disposed on said axis irrespective of the fuel level. The fuel tank is disposed wholly within the confines of the rear tubular structure so that it is protected thereby.

Figure 9:
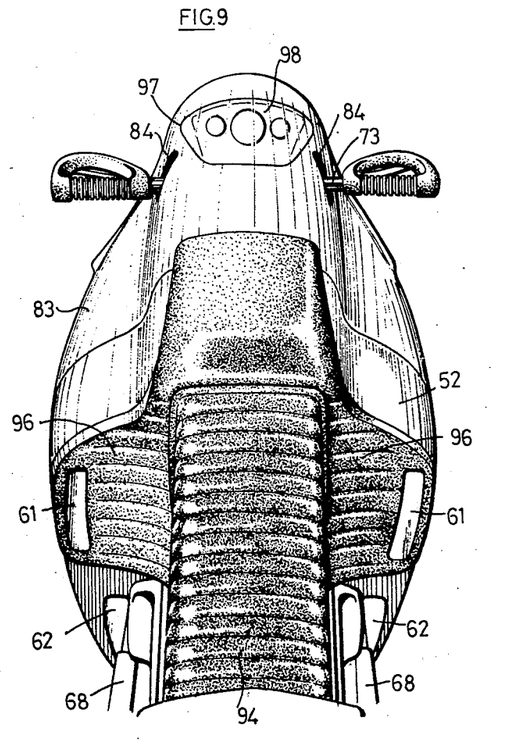
FIG. 9 is a perspective plan view of the front part of the motor cycle shown in FIG. 8.

The front tubular structure 53 is enclosed within a lightweight hollow faired housing 83, for example of a relatively thin plastics material. This housing is generally of rounded bullet form and is secured at its rear end to the bulkhead. The housing is formed with two side slots 84 through which the handlebars 73 extend and with a central air duct 85, two upper side air ducts 86 and two lower side air ducts 87, all of which ducts open forwardly of the motor cycle and extend rearwardly through the housing.

The faired housing 83 is recessed centrally at its underside as shown at 88 to accommodate the front wheel 50, and the central air duct 85 opens at its front end into this recess. This air duct communicates at its rear end with a chamber 89 into which the air intakes 67 of the engine project, whereby when the motor cycle is in motion air enters the duct and is supplied to the intakes. The arrangement may be either that air is supplied to the intakes with a ram effect or the chamber 89 acts as a plenum chamber in which a body of still air is created for supply to the intakes. The air duct 85 has a lower face 90 which is inclined to the horizontal with its front end lower than its rear end so that the air flow over this face applies a downthrust to the housing and hence to the front wheel of the motor cycle thereby to improve its traction. The duct also has an inclined upper face 91 which diverges with respect to the lower face in the forwards direction so that the duct is of wedge shape in side elevation (or it may be conical) with the wide end forming a forwardly facing mouth. The air duct may be divided into a number of separate ducts one for each engine air intake. If the motor cycle has an engine with only one air intake, there will, of course, be only one duct.

The air ducts 86 which open at opposite sides of the faired housing communicate at their rear ends with the pair of apertures 61 in the bulkhead in which are mounted, respectively, two radiators 92 of the water cooling system of the engine. Thus, the ducts 86 direct cooling air to and through the radiators.

The air ducts 87 which also open at opposite sides of the faired housing, communicate at their rear ends with the upper portions of the pair of apertures 62 in the bulkhead. Mounted in the upper portions of these apertures are two radiators 93 of the oil cooling system of the engine, whereby the ducts 87 direct cooling air to and through the radiators, the air issuing rearwardly from the apertures in the bulkhead.

In a modification, the ducts 86 and 87 may be of the same form as the duct 85.

A padded seat 94 is mounted on the rear structure 54. This seat has two downwardly extending side portions 95 which partially cover the sides of the structure and the fuel tank 82. The seat also has two outwardly projecting portions 96 which are attached to the side portions of the rear face of the bulkhead and provide leg shields for the rider. The portions 96 of the seat are formed respectively with two slots which communicate with the apertures 61 in the bulkhead. These slots extend generally parallel to the respective adjacent side edges of the bulkhead and open rearwardly whereby, when the motor cycle is in motion, the air issuing rearwardly from the apertures 61 through the slots produces two generally laminar air streams outside and past the rider's legs. This reduces air drag and improves the streamlining of the motor cycle and rider.

The upper surface of the nose of the faired housing 83 is provided with an opening 97 in which is disposed a tray carrying an instrument panel 98 and which is closed by a transparent cover flush with the surface of the housing. The instrument panel which may include a speedometer, a tachometer, an ammeter, a temperature gauge and indicator lamps, is disposed so as to be readily visible at a shallow angle to the rider through the transparent cover.

The instruments of conventional motor cycles constitute unsightly and dangerous projections. Thus, they break up the smooth lines of the cycle and also project into the air stream thereby affecting its streamlining, and they may cause injury to the rider if he hits them in an accident. All these disadvantages are overcome in the present arrangement by recessing the instrument panel into the faired housing. The transparent cover projects the instruments against the weather protects their reliability and life are therefore increased. The instrument panel is mounted in the tray through the medium of resilient mounts so that the vibration to which it is subjected, is reduced. The tray is readily removable for adjustment and replacement of the instruments.

Since the bulkhead 52 is of downwardly tapering oval form and no other parts of the motor cycle project beyond the sides of the bulkhead, the cycle can be leant sideways at a comparatively large angle so that when the cycle is being ridden there is an adequate ground clearance. Moreover, when the cycle is lying or falls on its side it assumes an angle to the ground, i.e. does not roll over into an almost horizontal position, so that fuel is less likely to be spilled from the fuel tank and the rider's legs are not trapped between the cycle and the ground. The shaping of the bulkhead is also such that the bulkhead provides protection for the rider's legs, particularly his knees which are disposed behind the widest part of the bulkhead, in side and angled impacts.

The upper part of the bulkhead is cut away at its sides to provide clearance for the rider's arms extending from behind the bulkhead towards the handlebars. It will be noted that the part of the bulkhead between the cut-away portions extends to a height above the steering head; it is this and the relatively large width of the bulkhead below the cut-away portions which enable the front structure 53 to be made of triangular form with the members 69 extending downwardly to the steering head and the rear ends of each pair of members 70, 71 widely spaced apart.

The bulkhead, which is slightly forwardly inclined to the vertical, is arranged to extend through or close to the vertical axis of the centre of gravity of the motor cycle so that when the latter is subjected to a side impact in a crash and the bulkhead, being the widest rigid part of the frame, therefore acts as a vertical pivot about which the whole cycle turns relative to the object which has been hit, the yaw moment about the pivot is less than that which occurs, for example, with a conventional laterally projecting crash bar mounted forwardly of the centre of gravity.

Any spaces inside the faired housing 83 and beneath the seat 94 may be filled with an energy absorbing foamed plastics material.

I claim:

1. A motor cycle frame comprising a fundamental rigid member of unitary form which extends transversely of the frame and constitutes the widest and deepest part thereof, the member being relatively narrow in the longitudinal direction of the frame and comprising mounting means for an engine and a gear box; a front cantilever structure which is secured to the member so as to be supported thereby and to project solely forwardly therefrom; and a rear cantilever structure which is secured to the member so as to be supported thereby and to project solely rearwardly therefrom, the front and rear structures being independent of one another.

2. The motor cycle frame of claim 1 wherein the rear structure carries a seat disposed behind the rigid member, the said member has secured thereto a rearwardly projecting support which carries footrests disposed behind the member and below the rear structure, and the member has portions projecting laterally beyond the sides of the rear structure and providing leg shields.

3. The motor cycle frame of claim 1, wherein the front structure comprises a plurality of elongate members secured at their rear ends to the rigid member at spaced apart locations adjacent to the outer periphery of the member and extending solely forwardly from the member, the elongate members converging towards their front ends so that the structure is of triangular form in both plan view and side elevation, the front ends of the elongate members carrying mounting means for a front wheel.

4. The motor cycle frame of claim 1, wherein the rear structure comprises a plurality of elongate members secured at their front ends to the rigid member at spaced apart locations adjacent to the outer periphery of the member and extending solely rearwardly from the member, the elongate members converging towards their rear ends so that the structure is of triangular form in both plan view and side elevation, the rear ends of the elongate members carrying mounting means for a suspension for a rear wheel.

5. The motor cycle frame of claim 1 wherein the rigid member comprises upper and lower portions and an intermediate portion, the intermediate portion constituting the widest part of the member and being disposed above the engine and the gearbox mounted on the member, the lower portion being of downwardly tapering form and the upper portion having cut-away parts at its sides.

6. The motor cycle frame of claim 1, wherein the rigid member comprises a rigid box-form structure comprising two spaced transverse metal plates formed with two aligned apertures, a metal web extending around and secured to the peripheries of the plates, and a metal web extending around and secured to the edges of the apertures in the plates to form an opening in the member to receive a part of the engine and the gearbox mounted on the member.

7. The motor cycle frame of claim 1, wherein a container for fuel is mounted in the rear structure behind the rigid member.

8. The motor cycle frame of claim 1, wherein the front structure is enclosed within a hollow faired housing secured to the frame, the upper surface of the housing being formed with a recess accommodating an instrument panel and the recess being closed by a transparent cover flush with said surface so that the panel does not project upwardly from the housing.

9. A motor cycle frame comprising a rigid transverse bulkhead comprising mounting means for an engine and a gear box, a front cantilever structure which is supported by and projects forwardly from the bulkhead, and a rear cantilever structure which is supported by and projects rearwardly from the bulkhead, the front structure comprising two elongate members extending forwardly from the bulkhead at a downwards inclination, two elongate members extending forwardly from the bulkhead in horizontal dispositions and two elongate members extending forwardly from the bulkhead at an upwards inclination, the members converging towards their front ends which carry mounting means for a front wheel.

10. A motor cycle frame comprising a rigid transverse bulkhead comprising mounting means for an engine and a gear box, a front cantilever structure which is supported by and projects forwardly from the bulkhead, and a rear cantilever structure which is supported by and projects rearwardly from the bulkhead, the rear structure comprising two elongate members extending rearwardly from the bulkhead at a downwards inclination and two elongate members extending rearwardly from the bulkhead at an upwards inclination, the members converging towards their rear ends which carry mounting means for a suspension for a rear wheel.

11. A motor cycle frame comprising a fundamental rigid member of unitary form which extends transversely of the frame and constitutes the widest and deepest part thereof, the member being relatively narrow in the longitudinal direction of the frame and comprising mounting means for an engine and a gearbox and carrying mounting means for a rear wheel; a front cantilever structure comprising a plurality of elongate members secured at their rear ends to the rigid member at spaced apart locations adjacent to the outer periphery of the member and extending solely forwardly from the member, the elongate members converging towards their front ends so that the structure is of triangular form in both plan view and side elevation, the front ends of the elongate members carrying mounting means for a front wheel; a rear cantilever structure comprising a plurality of elongate members secured at their front ends to the rigid member at spaced apart locations adjacent to the outer periphery of the member and extending solely rearwardly from the member, the elongate members converging towards their rear ends so that the structure is of triangular form in both plan view and side elevation, the rear ends of the elongate members carrying mounting means for a suspension for the rear wheel; and a hollow faired housing secured to the frame and enclosing the front structure.

12. The motor cycle frame of claim 11 wherein the rear structure carries a seat disposed behind the rigid member, the said member has secured thereto a rearwardly projecting support which carries footrests disposed behind the member and below the rear structure, and the member has portions projecting laterally beyond the sides of the rear structure and providing leg shields.

13. The motor cycle frame of claim 11 wherein the rigid member comprises upper and lower portions and an intermediate portion, the intermediate portion constituting the widest part of the member and being disposed above the engine and the gearbox mounted on the member, the lower portion being of downwardly tapering form and the upper portion having cut-away parts at its sides.

14. The motor cycle frame of claim 11 wherein the hollow faired housing is formed with at least one forwardly opening air duct for supplying air to a part of the engine mounted on the rigid member.

* * * * *